United States Patent
Ibsen et al.

(10) Patent No.: US 9,168,501 B2
(45) Date of Patent: Oct. 27, 2015

(54) COMMERCIAL FISCHER-TROPSCH REACTOR

(75) Inventors: Mark Ibsen, Highlands Ranch, CO (US); Sergio Mohedas, Westminster, CO (US); Frank Hogsett, Arvada, CO (US); Mark Bohn, Golden, CO (US); Harold A. Wright, Longmont, CO (US)

(73) Assignee: RES USA, LLC, Commerce City, CO (US)

( * ) Notice: Subject to any disclaimer, the term of this patent is extended or adjusted under 35 U.S.C. 154(b) by 233 days.

(21) Appl. No.: 12/206,538

(22) Filed: Sep. 8, 2008

(65) Prior Publication Data

US 2009/0069450 A1    Mar. 12, 2009

Related U.S. Application Data

(60) Provisional application No. 60/971,157, filed on Sep. 10, 2007.

(51) Int. Cl.
| | |
|---|---|
| *B01J 8/22* | (2006.01) |
| *C10G 2/00* | (2006.01) |
| *B01J 8/00* | (2006.01) |
| *B03C 1/28* | (2006.01) |
| *B03C 1/30* | (2006.01) |

(52) U.S. Cl.
CPC .. *B01J 8/22* (2013.01); *B01J 8/005* (2013.01); *B01J 8/007* (2013.01); *B01J 8/228* (2013.01); *B03C 1/288* (2013.01); *B03C 1/30* (2013.01); *C10G 2/342* (2013.01); *B03C 2201/18* (2013.01)

(58) Field of Classification Search
None
See application file for complete search history.

(56) References Cited

U.S. PATENT DOCUMENTS

| | | | | |
|---|---|---|---|---|
| 2,662,091 | A | * 12/1953 | Odell | 518/700 |
| 5,811,469 | A | * 9/1998 | Leviness et al. | 518/700 |
| 6,068,760 | A | * 5/2000 | Benham et al. | 518/705 |
| 6,114,399 | A | 9/2000 | Roberts et al. | |
| 6,306,917 | B1 | 10/2001 | Bohn et al. | |

(Continued)

FOREIGN PATENT DOCUMENTS

| | | |
|---|---|---|
| EP | 1964908 A1 | 9/2008 |
| GB | 2403433 | 1/2005 |

(Continued)

OTHER PUBLICATIONS

Australian Office Action dated Feb. 17, 2012 for corresponding Australian Application No. 2008299107 (2 pgs).

(Continued)

*Primary Examiner* — Jennifer A Leung
(74) *Attorney, Agent, or Firm* — Timothy S. Westby; Porter Hedges LLP

(57) ABSTRACT

A catalytic reaction system comprising: a catalytic reactor fluidly connected with at least two slurry loops, wherein the reactor comprises at least as many reactor product outlets and at least as many slurry return inlets as slurry loops; wherein each slurry loop comprises a separation system comprising a separation system inlet, a separation system product outlet, and a concentrated catalyst slurry outlet; a slurry offtake fluidly connecting the separation system inlet with one of the reactor product outlets; and a slurry return fluidly connecting the separation system outlet with one of the slurry return inlets. The system may comprise at least three slurry loops. The system may comprise at least four slurry loops. A method for converting synthesis gas into liquid hydrocarbons via the catalytic reaction system in also disclosed.

21 Claims, 2 Drawing Sheets

(56) References Cited

U.S. PATENT DOCUMENTS

| | | |
|---|---|---|
| 6,649,803 B2 | 11/2003 | Mart et al. |
| 6,712,982 B2 * | 3/2004 | Bohn et al. ............... 210/802 |
| 6,730,221 B2 | 5/2004 | Bohn et al. |
| 6,812,179 B2 | 11/2004 | Huang et al. |
| 2003/0018089 A1 | 1/2003 | Schweitzer et al. |
| 2004/0050806 A1 * | 3/2004 | Espinoza et al. ............... 210/806 |
| 2004/0235968 A1 * | 11/2004 | Jiang et al. ............... 518/726 |
| 2004/0235969 A1 * | 11/2004 | Espinoza et al. ............... 518/726 |
| 2005/0035030 A1 * | 2/2005 | Oder et al. ............... 209/232 |
| 2006/0111232 A1 * | 5/2006 | Spena et al. ............... 502/29 |
| 2009/0220389 A1 | 9/2009 | Onishi et al. |

FOREIGN PATENT DOCUMENTS

| | | |
|---|---|---|
| WO | 03006577 | 1/2003 |
| WO | WO 2005035131 A1 * | 4/2005 |
| WO | 2007069317 A1 | 6/2007 |
| ZA | 201002006 | 5/2011 |

OTHER PUBLICATIONS

Canadian Office Action dated Mar. 20, 2013 for corresponding Canadian Application No. 2,699,781 (2 pgs.).

Canadian Office Action dated May 18, 2012 for counterpart Canadian Application 2699781; 2 pages.

Chinese Office Action dated Oct. 21, 2013 for corresponding Chinese Application No. 200880113458.0 (3 pgs.).

Chinese Office Action dated Apr. 28, 2013 for corresponding Chinese Application No. 200880113458.0 (8 pgs.).

European Examination Report dated Nov. 24, 2014 for corresponding European Application No. 8830515.6-1352 (4 pgs.).

European Search Report dated Sep. 12, 2014 for corresponding European Application No. 14170586.3-1352 (5 pgs.).

Indonesian Examination Report dated Feb. 26, 2014 for corresponding India Application No. 2298/DELNP/2010 (2 pgs.).

International Search Report, International Application No. PCT/US2008/075709, dated Jan. 21, 2009.

Canadian Office Action dated Sep. 27, 2011, CA Application No. 2699781, pp. 1-4.

European Extended Search Report dated Oct. 10, 2011, EP Application No. 08830515.6, pp. 1-5.

European Patent Convention Office Action dated Jun. 14, 2012 for corresponding European patent Application No. 08830515.6 (4 pgs.).

Chinese Office Action dated Aug. 20, 2012 for corresponding Chinese patent Application No. 200880113458.0 (8 pgs.).

* cited by examiner

COMMERCIAL FISCHER-TROPSCH REACTOR

CROSS-REFERENCE TO RELATED APPLICATIONS

This application claims the benefit under 35 U.S.C. §119 (e) of U.S. Provisional Patent Application No. 60/971,157 filed Sep. 10, 2007, the disclosure of which is hereby incorporated herein by reference.

STATEMENT REGARDING FEDERALLY SPONSORED RESEARCH OR DEVELOPMENT

Not applicable.

BACKGROUND OF THE INVENTION

1. Field of the Invention

This invention relates generally to the field of Fischer-Tropsch synthesis. More specifically, the invention relates to a system and method for converting syngas to hydrocarbons via Fischer-Tropsch synthesis. The system and method involve at least two slurry loops comprising at least one magnetic dynamic settling vessel or three or more slurry loops for separating catalyst slurry from gaseous and liquid Fischer-Tropsch products. The slurry loops are in fluid communication with the Fischer-Tropsch reactor.

2. Background of the Invention

Natural gas, coal deposits, and biomass are abundant energy sources that often serve as fuel for a large number of daily uses including heating and power generation. While abundant, the location of these deposits far from industrialized, commercial infrastructure represents a significant hurdle to increased application as a replacement for oil distillates. Additionally, natural gas must be converted to a liquid by an expensive and energy intensive process. Comparatively, as solids coal and biomass have substantial mass for their energetic yield, requiring special tools, packaging and carriers to transport them.

Liquid fuels that are easily transported long distances without expensive processes or packaging are highly advantageous. However, current petroleum exploration and production are unable to keep up with global demands for fuel. This trend is not predicted to change in the future. Resultantly, oil reserves are being depleted despite the rising costs to the end consumer. For this reason increased attention, interest, and investment go into developing technologies that convert solid or gaseous fuels into liquid fuels.

The process of converting the available material to a liquid fuel involves the partial oxidation of the material prior to a catalyzed reaction to create a liquid fuel. The Fischer-Tropsch (FT) reactors contain the vital step of catalyzed synthesis of synthetic petroleum substitute liquid fuels. The process occurs via a catalyzed chemical reaction in which carbon monoxide and hydrogen from the material are converted into liquid hydrocarbons. The reaction is highly exothermic, and requires a cooled reactor to maintain conditions favorable for continued synthesis. Commercial FT reactors require cooling liquid to be transported through heat exchanging conduits in order to remove heat from the reactor.

Additionally, the desirable liquid or wax product must be separated from the catalyst, intermediate hydrocarbon, and associated gases in the reaction slurry which may be returned to the reactor. Current reactor systems use a number of processes in this separation step including filtering, and settling. The process of filtering the solid material and wax from the reaction slurry requires a high energy investment, however, as the mixture must be continuously pumped (circulated) through the system at a rate exceeding the product draw rate. Additionally, maintenance and cleaning of these systems requires stopping the reactor processes completely.

Settlers are a highly preferred method of separation. While comparatively a lower maintenance method of separation, they are highly dependent on the size, shape, and consistency of the solid catalyst particles. Longer time periods, or multiple steps in series or parallel are often required to fully separate the liquid fuel. The number of these devices dictates the rate at which the reactor can produce suitable synthetic products for further processing.

Consequently, there is a need for a commercial FT reactor design that maximizes reactor run time, and efficiency in separating synthetic liquid products from reaction catalyst slurry by incorporating multiple slurry loops and a large slurry bed FT reactor.

SUMMARY

These and other needs in the art are addressed in one embodiment by a commercial FT reactor system comprising two or more, preferably three or more slurry loops for the purpose of removing desirable synthesis products from the reactor for further processing.

The increased number and smaller size of the slurry loops may provide operational flexibility, efficiency, and increased run time to a commercial reactor. The multiple slurry loops contain separators that may be individually isolated from the reactor outlet stream for maintenance, while others remain on stream.

Herein disclosed is a catalytic reaction system comprising: a catalytic reactor fluidly connected with at least two slurry loops, wherein the reactor comprises at least as many reactor slurry outlets and at least as many slurry returns as slurry loops; wherein each slurry loop comprises a separation system comprising at least one separation device for separating concentrated catalyst slurry from liquid product; an inlet of the at least one separator fluidly connected to one of the reactor product outlets via a slurry offtake, and an outlet of the at least one separator fluidly connected to one of the slurry return inlets via a slurry return. In embodiments, the catalytic reactor is a multi-phase Fischer-Tropsch slurry bubble column reactor. In some embodiments, the catalytic reactor has a main cylindrical body with an inner diameter greater than 6 feet. In some embodiments, the catalytic reactor has a main cylindrical body with an inner diameter greater than 10 feet. In embodiments, the catalytic reactor has a total vertical height greater than 50 feet. In embodiments, the catalytic reactor has exterior walls that can withstand internal pressures in the range of from about 10 atmospheres to about 40 atmospheres.

The catalytic reactor may further comprise a synthesis gas inlet comprising multiple nozzles. In embodiments, the multiple nozzles are positioned within the lower 20% of the total vertical height of the catalytic reactor. In embodiments, additional multiple nozzles are positioned within the lower 50% of the total vertical height of the catalytic reactor. In some embodiments, feed nozzles are positioned near substantially the middle of the total vertical height of the catalytic reactor. In embodiments, the reactor product outlets are located within the top 50% of the total vertical height of the catalytic reactor. The reactor product outlets may have a diameter in the range of from about 6 in. and about 5 ft. The reactor product outlets may have a diameter in the range of from about 4 in. and about 5 ft. In some embodiments, at least one separation system of one or more of the slurry loops comprises 2 or more separation devices. Each separation system may comprise one or more separation devices selected from the group consisting of filtration units, magnetic separators, vertical settlers, inclined settlers, dynamic settlers, magnetic dynamic settlers and combinations thereof.

In some embodiments of the catalytic reaction system, the slurry return inlets are positioned within the bottom 50% of the total vertical height of the catalytic reactor. The slurry return inlets may have a diameter in the range of from about 4 in and about 5 ft. The internal diameter of each separation device may be in the range of from about 2 ft to about the internal diameter of the catalytic reactor. In embodiments, the vertical height of each separation device is less than the total vertical height of the catalytic reactor.

In some embodiments of the catalytic reaction system, the distance from an outer wall of the catalytic reactor to an outer wall of the at least one separation device of each slurry loop is less than the internal diameter of the catalytic reactor. The angle formed by the reactor vertical axis and each slurry offtake may be between about 30 degrees and 90 degrees. The angle formed by the reactor vertical axis and each slurry return may be between about 30 degrees and 90 degrees.

In some embodiments, the distance between the reactor product outlet and the slurry return inlet is greater than about half the total vertical height of the catalytic reactor. The distance between the reactor product outlet and the slurry return inlet of each slurry loop may be greater than about one half the total vertical height of the catalytic reactor. In embodiments, the reactor product (the product that is liquid at typical reaction pressures and temperatures) outlets are located in the lower 90% of the total vertical height of the catalytic reactor.

Also disclosed herein is a method for converting synthesis gas into liquid hydrocarbons. The method comprises: introducing a synthesis gas feed into a Fischer-Tropsch reactor of a Fischer-Tropsch system according to this disclosure at a superficial gas velocity greater than the average sedimentation velocity or greater than the minimum fluidization velocity of catalyst in the catalytic reactor; separating concentrated catalyst slurry from the reaction product via at least two slurry loops according to this disclosure; removing liquid hydrocarbon product from the at least one separator of each of the at least two slurry loops; and returning concentrated catalyst slurry to the catalytic reactor via the at least as many slurry returns and the at least as many slurry return inlets. In embodiments, the method comprises at least three slurry loops. In alternative embodiments, the system comprises at least four slurry loops.

In embodiments, the method comprises an overall superficial velocity of the synthesis gas fed to the catalytic reactor of equal to or greater than about 5 cm/s. In embodiments, the method comprises an overall superficial velocity of the synthesis gas fed to the catalytic reactor of equal to or greater than about 9 cm/s. In embodiments, the overall superficial velocity of the synthesis gas fed to the catalytic reactor is equal to or greater than about 15 cm/s. In embodiments of the method, the liquid upflow velocity in the at least one separator of one or more of the slurry loops is in the range of from about 15 cm/h to about 100 cm/h. In some embodiments of the disclosed method, the catalyst has magnetic and/or paramagnetic properties and at least one of the slurry loops comprises a magnetic dynamic settler. In embodiments, the liquid upflow velocity in the dynamic settler(s) is greater than 15 cm/h; alternatively, greater than 50 cm/hr; alternatively greater than about 90 cm/h.

In embodiments, the magnetic dynamic settler comprises at least one magnetic component selected from magnetic external walls, magnetic internal walls, magnetic internal baffles, magnetic internal fins, magnetic internal rods, magnetic internal plates, and other magnetized internal components; at least one magnetic field within the slurry body of the magnetic dynamic settler; and/or a combination thereof.

The at least one magnetic component may be magnetized by or a magnetic field within the settler created with one or more magnets. The magnets may be permanent magnets, electric coil driven magnets, or a combination thereof. In embodiments wherein at least one slurry loop comprises at least one magnetic dynamic settler, the liquid linear upward velocity in the magnetic dynamic settler is greater than 15 cm/h. Alternatively, the liquid linear upward velocity in the settler is greater than about 30 cm/h. Alternatively, the liquid linear upward velocity in the settler is greater than about 45 cm/h. Alternatively, the liquid linear upward velocity in the magnetic dynamic settler is greater than about 90 cm/h.

Thus, the present invention comprises a combination of features and advantages which enable it to overcome various problems of prior devices. The foregoing has outlined rather broadly the features and technical advantages of the invention in order that the detailed description of the invention that follows may be better understood. The various characteristics described above, as well as other features, will be readily apparent to those skilled in the art upon reading the following detailed description of the preferred embodiments of the invention, and by referring to the accompanying drawings. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following descriptions and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to . . . ". The terms "in fluid communication" or "fluidly connected to" are intended to mean either an indirect or direct connection. Thus, if a first apparatus is 'fluidly connected to' or 'in fluid communication with' a second apparatus, the connection may be a direct connection or an indirect connection via other apparatus and/or connections.

The term 'superficial velocity' is defined herein as the volumetric gas flow rate divided by the reactor open cross sectional area.

DETAILED DESCRIPTION

Herein disclosed is a slurry Fischer-Tropsch system and a method of using the system to carry out multi-phase Fischer-Tropsch (hereinafter FT) conversion of synthesis gas (hereinafter syngas, which is primarily comprised of $H_2$ and CO) to FT product hydrocarbons. The slurry FT system comprises separators for separation of FT catalyst from product wax so that the wax and gaseous products may be recovered for further processing/sale and catalyst may be returned to the reactor (e.g. slurry bubble column Fischer-Tropsch reactor). The herein disclosed FT system comprises a FT reactor and multiple slurry loops which will be described further hereinbelow.

Figure 1:
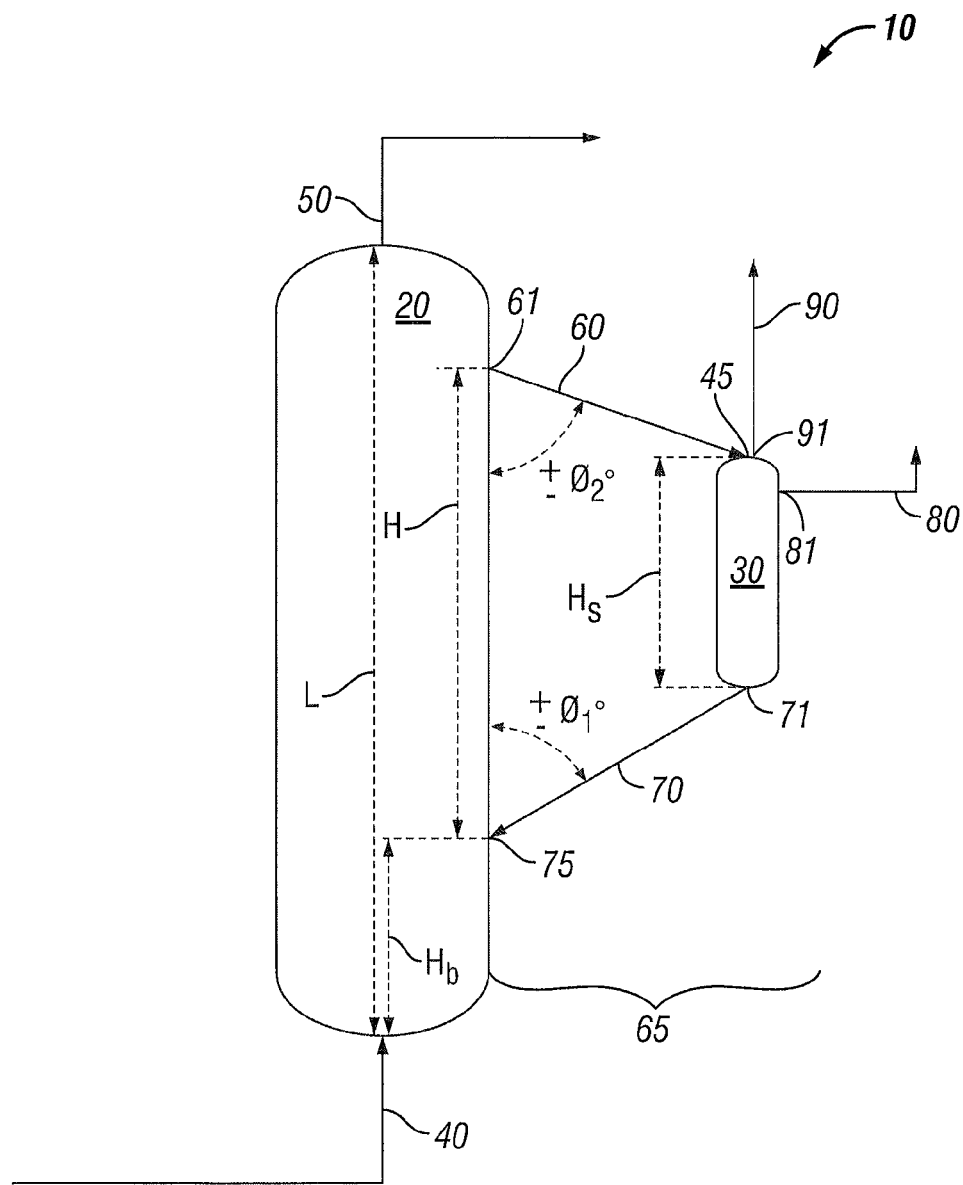
FIG. 1 is a schematic of a side view of a FT system according to an embodiment of the present disclosure.

FIG. 1 is a schematic of a side view of a FT system 10 according to an embodiment of the present disclosure. FT system 10 comprises FT reactor 20 and at least two slurry loops 65 for separating catalyst slurry from the FT conversion product and returning slurry to the FT reactor 20. In certain embodiments, FT system 10 comprises FT reactor 20 and at least three slurry loops 65 for separating catalyst slurry from the FT conversion product and returning slurry to the FT reactor 20. In FIG. 1, one of the slurry loops 65 is depicted. Each slurry loop 65 comprises a slurry offtake 60, at least one separator 30, and slurry return 70. Each slurry loop fluidly connects a reactor product outlet 61 and a slurry return inlet 75 of FT reactor 20 with intervening wax removal separation equipment. Components of the FT system will be described in more detail hereinbelow.

The use of a greater number of smaller diameter catalyst/wax separation vessels 30 increases operational flexibility and manufacture of FT system 10.

FT Reactor

In embodiments, FT reactor 20 comprises a slurry bubble column reactor. In embodiments, FT reactor 20 has a diameter of from about 10 feet and about 40 ft. In embodiments, FT reactor 20 has a cylindrical body. In preferred embodiments, the metal wall thickness of FT reactor 20 is capable of withstanding pressures in the range of from about 10 atm. to about 40 atm. FT reactor 20 comprises at least one syngas feed inlet 40 and at least one overhead tail gas outlet 50. In embodiments, the at least one overhead tail gas outlet 50 is located at or near the top of FT reactor 20. In embodiments, overhead tail gas outlet 50 is fluidly connected to a product collection system as known to those of skill in the art to be capable of removing product (e.g., crude light distillate, crude mid-distillate, FT water, or a combination thereof) from the FT tail gas.

In embodiments, gas inlet 40 is located at or near the bottom of FT reactor 20. In embodiments, syngas feed inlet 40 is positioned within the bottom 20% of the total vertical height, L, of reactor 20. In embodiments, an additional syngas feed inlet is positioned within the bottom 50% (not depicted) of the total reactor height, L. In some embodiments, gas inlet 40 (and optional feed nozzles) is positioned at or near the middle of the total vertical height of reactor 20.

The superficial velocity is defined herein as the overall volumetric gas feed rate divided by the cross sectional area of the main reactor body. In embodiments, syngas feed inlet 40 comprises multiple nozzles such that the overall superficial velocity is greater than the average sedimentation velocity or greater than the minimum fluidization velocity of the solid catalyst in reactor 20. In specific embodiments, syngas feed inlet 40 comprises multiple nozzles such that the resulting overall superficial velocity is greater than about 9 cm/s; alternatively, greater than about 15 cm/s; alternatively, in the range of from about 5 cm/s to 25 cm/s; alternatively, in the range of from about 10 cm/s to about 20 cm/s; alternatively in the range of from about 12 cm/s to about 18 cm/s; alternatively in the range of from about 14 cm/s to about 18 cm/s. FT reactor 20 may further comprise inlet(s) for fresh activated catalyst slurry and inlet(s) for gas return from at least one of the separators 30 (not shown in FIG. 1).

The FT conversion within FT reactor 20 is exothermic. FT reactor 20 may comprise coils to remove the heat of reaction. In embodiments, FT reactor 20 comprises at least one coil within the main cylindrical body. In embodiments, reactor 20 comprises coils internal to the reactor. The coils will remove the exothermic heat of reaction via the vaporization of a fluid. In embodiments, the coil(s) are steam generating coils and the fluid to be vaporized comprises water. In some embodiments, steam is generated at pressures in the range of from 200 psig to about 500 psig. In optimum embodiments, steam is generated at a pressure of from 400 psig to about 450 psig. In embodiments, reactor 20 comprises more than one set of cooling coils. In some embodiments, reactor 20 comprises at least one lower coil and at least one upper coil. By adjusting the flowrate through the coils, different amounts of heat may be removed from reactor 20. Alternatively, by adjusting directly or indirectly the temperature of the fluid in the coils, different amounts of heat may be removed from reactor 20. Typically, a lower cooling coil will generate more steam than an upper coil due to higher reaction rate and/or to higher catalyst concentration at the bottom of the reactor. This higher reaction may be due to the initial reaction with the syngas as it enters the reactor or uneven catalyst loading. For example, catalyst loading may be greater near the bottom of reactor 20 due to nonideal fluidization that does not provide uniform catalyst distribution.

In embodiments, FT reactor 20 comprises steam coils in the main body of the reactor. In embodiments, FT reactor 20 comprises coils having an outer coil diameter in the range of from about 0.75 inch to 6 inches. In embodiments, the cumulative fraction of the cross sectional area of the coils to the cross sectional area of the main body of reactor 20 is in the range of from about 0.10 to about 0.50. In embodiments, reactor 20 comprises bayonet tubes arranged substantially vertically within reactor 20. In some embodiments, water is fed to bayonet tubes at or near the top of the reactor 20 and steam is removed from at or near the top of reactor 20. In some embodiments, water is fed at or near the bottom of reactor 20 and steam is removed at the top of the tubes at or near the top of reactor 20.

Near the top of FT reactor 20, some portion of slurry is withdrawn through multiple nozzles. In embodiments, a portion of slurry is withdrawn via at least two slurry offtakes 60 which are positioned near the top of FT reactor 20. Near the top of FT reactor 20, some portion of slurry is withdrawn through multiple nozzles. In some embodiments, a portion of slurry is withdrawn via at least three slurry offtakes 60 which are positioned near the top of FT reactor 20. In still other variations of the disclosed system, a portion of slurry is withdrawn via at least four slurry offtakes 60 which are positioned near the top of FT reactor 20. Each slurry offtake 60 fluidly connects a reactor product outlet 61 to a separator inlet 45 of a separator 30.

In embodiments, reactor 20 comprises at least two reactor product outlets located within the top 50% of the total vertical height, L, of the main body of reactor 20. In other embodiments, reactor 20 comprises at least three reactor product outlets located within the top 50% of the total vertical height of the main body of reactor 20. In yet other embodiments, reactor 20 comprises at least four reactor product outlets located within the top 50% of the total vertical height of the main body of reactor 20.

Reactor product outlets 61 may have a diameter of greater than 6 inches. In embodiments, the reactor slurry outlets 61 have a diameter of less than 5 ft. In embodiments, the reactor product outlets 61 have a diameter of greater than 6 inches and less than 5 ft.

Slurry Loops

Each of the two or more slurry loops 65 comprises at least one separator 30 for catalyst/wax separation, a slurry offtake 60, and a slurry return 70. In embodiments having two slurry loops, at least one of the slurry loops comprises a magnetic dynamic settler, as discussed further hereinbelow, and the other slurry loop comprises a separator selected from the group consisting of filtration units, magnetic separators, settling units (e.g. vertical settlers, inclined settlers), dynamic settlers, and magnetic dynamic settlers. In embodiments, comprising 3 or more slurry loops 65, each separator 30 may be any separation apparatus known to those of skill in the art to be suitable for the separation of catalyst from product wax. In embodiments, the at least one separator 30 of each of the three or more slurry loops 65 is selected from the group consisting of filtration units, magnetic separators, settling units (e.g. vertical settlers, inclined settlers), dynamic settlers, magnetic dynamic settlers and combinations thereof.

In embodiments, at least one slurry loop 65 comprises more than one separator in series. In embodiments, at least one slurry loop 65 comprises more than one separator in parallel. In specific embodiments, each slurry loop comprises at least one dynamic settler. In embodiments, at least one slurry loop 65 comprises two or more dynamic settlers in series or in parallel.

Each separator 30 comprises at least one separator inlet 45 positioned in the top portion of the separator, a concentrated catalyst slurry outlet 71 whereby catalyst slurry comprising a higher concentration of solids than the catalyst slurry entering via separator inlet 45 exits the separator 30, and clarified wax outlet 81 whereby a stream of fluid comprising a lower concentration of solids than the slurry entering separator 30 via separator inlet 45 exits the separator 30. Catalyst slurry outlet 71 is positioned in the lower portion of separator 30 while liquid product outlet 81 is located within the top portion of separator 30.

In embodiments comprising two slurry loops at least one slurry loop comprises at least one magnetic dynamic separation vessel (MDSV). In embodiments comprising 3 or more settlers, one or more of the settlers may be a MDSV. A MDSV will be useful when the catalyst has magnetic or paramagnetic properties at the operating temperature. In embodiments, the catalyst is a FT catalyst comprising iron, cobalt, or both.

In embodiments, the at least one MDSV is roughly conically shaped in the bottom zone. In some embodiments, the at least one MDSV comprises vertical upper walls and inclined lower walls. MDSV separator 30 may comprise magnetic components selected, but not limited to, magnetic external walls, magnetic internal walls, magnetic internal baffles, magnetic internal fins, magnetic internal rods, magnetic internal plates, another magnetized internal component, magnetic fields created inside the slurry body in the settler, and/or a combination thereof. The at least one magnetic component may be magnetized or a magnetic field within the settler created with one or more magnets. The magnets may be permanent magnets, electric coil driven magnets, or a combination thereof. In some embodiments wherein at least one slurry loop comprises at least one MDSV, the liquid linear upward velocity in the MDSV is greater than 15 cm/h. Alternatively, the liquid linear upward velocity in the MDSV is greater than about 30 cm/h. Alternatively, the liquid linear upward velocity in the MDSV is greater than about 45 cm/h. Alternatively, the liquid linear upward velocity in the MDSV is greater than about 90 cm/h.

In embodiments, the magnetized components of the MDSV are internal components. In embodiments, the magnetized internal components are positioned vertically. In embodiments, at least a portion of the walls of MDSV separator 30 is magnetized. In embodiments, at least a portion of the lower portion of MDSV separator 30 is magnetized through magnetic surfaces or magnetic fields created inside the slurry body in the vessel. In embodiments, MDSV separator 30 comprises magnetized internal components positioned at an incline. In embodiments, at least a portion the vertical walls of MDSV separator 30 is magnetized and/or magnetic fields are created inside the slurry body in the vessel in that zone. In embodiments, at least a portion of the inclined walls of MDSV separator 30 is magnetized.

As mentioned herein, MDSV separator 30 may comprise magnetized exterior walls. In embodiments, the walls of the separator are magnetized by at least one magnet. In embodiments, at least a portion of the walls of MDSV separator 30 are magnetized by a plurality of magnets. The catalyst particles entering MDSV separator 30 from slurry offtake 60 have magnetic properties and are thus attracted to the magnetic surfaces of the exterior MDSV vessel walls, magnetic internal components and/or to the magnetic fields in the vessel and, thereby, the catalyst particles may be separated from MDSV liquid product. In embodiments, MDSV separator 30 further comprises internal magnetized inclined plates. In embodiments, the top section of each magnetized plate/rod within MDSV separator 30 is magnetized. In embodiments, MDSV separator 30 comprises vertical magnetized rods/plates. One or more slurry loop 65 may comprise more than one MDSV. In embodiments, slurry loop 65 comprises more than one MDSV separator 30 with at least a portion of at least one MDSV separator 30 having magnetized walls.

The MDSV may be a dynamic settling vessel as described in U.S. Pat. No. 6,068,760 adapted to comprise at least one magnetic component or at least one magnetic field. The MDSV comprises a feed conduit extending downwardly into a sealed vertical dynamic settler chamber a substantial length. In embodiments, the feed conduit is a vertical feed conduit. In embodiments, the feed conduit extends at least 70% of the length of the MDSV such that the concentrated catalyst slurry from the reactor 20 discharges slurry within the lower portion of the MDSV. In embodiments, the feed conduit extends at least 80% of the length of MDSV. In embodiments, the feed conduit extends downwardly to within a conical zone at the bottom of the MDSV. In embodiments, the feed conduit is positioned in the geometric center of MDSV. In specific configurations the feed conduit is located at one side of the MDSV and the vessel further comprises internal plates, such as internal inclined plates.

As mentioned hereinabove, in embodiments, the feed conduit is positioned near the geometric center of the MDSV and forms an annular region between the inner walls of the chamber and the feed conduit, whereby as the slurry flows into an annular region at the bottom of the settler, the heavier catalyst particles settle down aided by gravity and the magnetic field within the MDSV and are removed as concentrated slurry at the bottom of MDSV via concentrated catalyst slurry outlet 71. Nonmagnetic wax product rises up in the annular section and clarified wax is removed by a wax liquid product outlet 81 and MDSV liquid product stream 80.

In embodiments, the MDSV further comprises a multichannel baffle as described in U.S. Pat. No. 6,730,221. The baffle(s) may help to prevent turbulence and/or improve retention of solid particles. The multichannel baffle may serve to divide the annular volume into plural channels. In embodiments, the maximum cross-sectional dimension of the channels is sufficiently small that natural convection flow is minimized and particle settling is promoted. In some embodiments, the multichannel baffle is positioned within the annular volume between the vessel walls and the feed conduit of MDSV. In these embodiments, wax liquid product outlet 81 communicates with the annular volume above the multichannel baffle and MDSV concentrated catalyst slurry outlet 71 communicates with the annular volume below the multichannel baffle. In embodiments, channels of the multichannel baffle have hexagonal cross section. Alternatively, the channels are circular in cross section.

Each separator 30 comprises at least one clarified wax outlet 81 through which wax product reduced in solids content is removed from separator 30 via separated product stream 80. In embodiments, clarified wax outlet 81 is located near the top of separator 30. In embodiments, each separator 30 further comprises at least one separator gas outlet 91 through which gas is removed from the catalyst/wax separator via gas stream 90. Separator gas outlet 91 is located at or near the top of separator 30. In embodiments, at least a portion of the gas exiting separator 30 via gas outlet 90 is recycled to FT reactor 20. Each slurry loop 65 further comprises slurry return 70 through which catalyst slurry is returned to reactor 20. In embodiments, each slurry return 70 fluidly connects reactor slurry return inlet 75 with a concentrated catalyst slurry outlet 71 of a separator 30. In embodiments, reactor 20 comprises at least two slurry return inlets 75 located within the bottom 50% of the total vertical height, L, of the main reactor body. In embodiments, reactor 20 comprises at least three slurry return inlets 75 located within the bottom 50% of the total vertical height of the main reactor body. In embodiments, reactor 20 comprises at least four slurry return inlets 75 located within the bottom 50% of the total vertical height of the main reactor body. Slurry return inlets 75 may have a diameter greater than 4 in. In embodiments, the slurry return inlets 75 have a diameter less than 5 ft. In embodiments, the slurry return inlets 75 have a diameter greater than 6 in. and less than 5 ft.

In embodiments where slurry loop 65 comprises more than one separator 30 in series, slurry return 70 fluidly connects reactor 20 slurry return inlet 75 with the concentrated catalyst slurry outlet 71 of the last separator 30 in the series. In embodiments, where slurry loop 65 comprises more than one separator 30 in parallel, slurry return 70 fluidly connects reactor 20 slurry return inlet 75 with the concentrated catalyst slurry outlets 71 of the separators 30.

In embodiments, concentrated slurry is removed from separator 30 via concentrated catalyst slurry outlet 71. At least a portion of the catalyst recovered from separator 30 is recycled to FT reactor 20 via slurry return 70. In embodiments, concentrated slurry is removed from a lower portion of separator 30. In some embodiments, separator concentrated slurry stream, clarified wax liquid separated product stream 80, or both undergo further settling or filtering processes. As mentioned above, separator 30 may further comprise at least one baffle which may help to prevent turbulence and/or improve retention of solid particles. In embodiments, the at least one baffle is a multi-channel baffle.

In embodiments, concentrated slurry is treated as known to those of skill in the art to further separate liquids therefrom and/or regenerate catalyst prior to recycle to reactor 20. Fischer-Tropsch catalyst may be regenerated by, for example, purging the catalyst with an inert gas or with a regenerating gas for a period of time, as known to those of skill in the art.

In embodiments, concentrated slurry returns to FT reactor 20 via slurry return 70 via gravity driven loop. In alternative embodiments, concentrated slurry returns to reactor 20 via pump-assisted loop.

In embodiments, reactor product outlet 61 comprises a nozzle which connects it to slurry offtake 60. In embodiments, each slurry return 70 is connected to slurry return inlet 75 with a nozzle.

Relative Geometry

Figure 2:
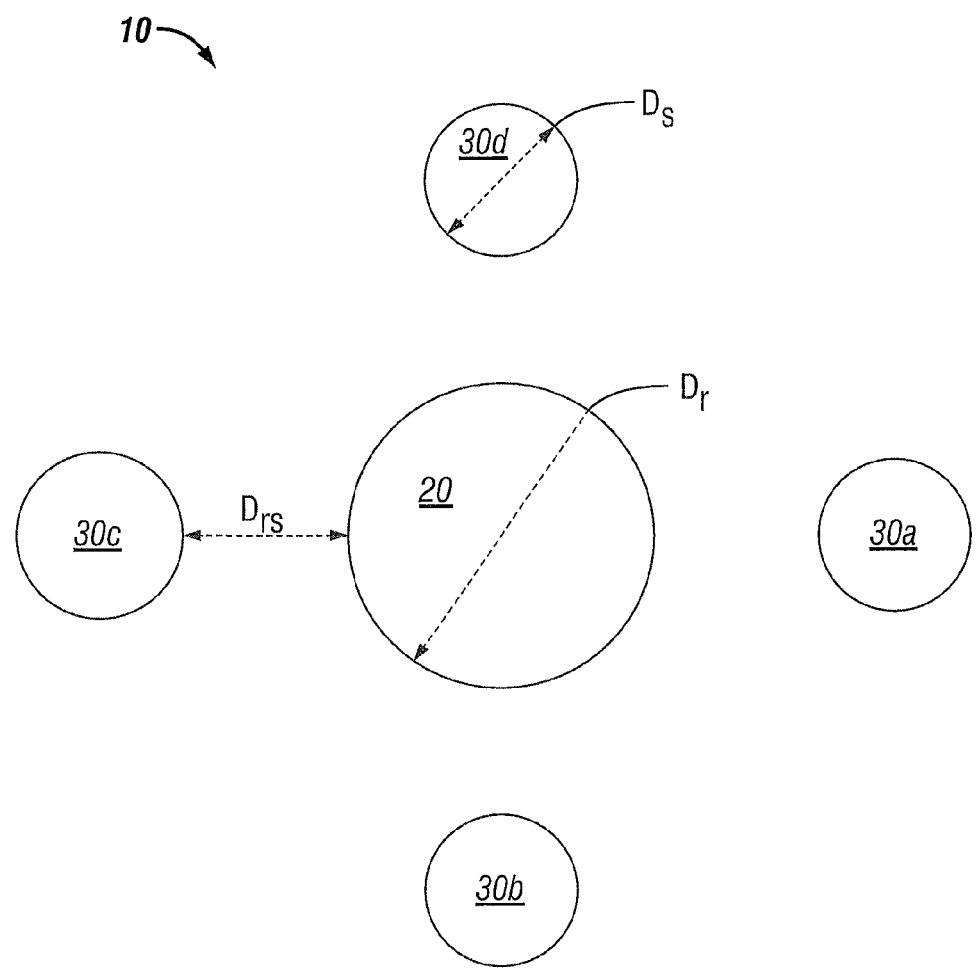
FIG. 2 is a schematic of a top view of an embodiment of a FT system according to the present disclosure.

FIG. 2 is a schematic of a top view of an embodiment of a FT system 10 according to the present disclosure. FT system 10 comprises two or more slurry loops 65. In preferred embodiments, FT system 10 comprises more than 3 slurry loops 65. In the embodiment of FIG. 2, FT system 10 comprises 4 separators: settler 1 (30a), settler 2 (30b), settler 3 (30c), and settler 4 (30d), each making up the at least one separator 30 of a slurry loop 65. In preferred embodiments, FT system 10 comprises four slurry loops 65. As mentioned hereinabove, each slurry loop 65 comprises 1 or more separator 30; in embodiments where a slurry loop 65 comprises 2 or more separators 30, the 2 or more separators 30 may be oriented in series and/or parallel.

In embodiments, the inner diameter $D_r$ of FT reactor 20 is greater than or equal to 6 feet and less than 60 feet. For example, biomass gasification plants may utilize FT reactor(s) 20 having relatively small diameters when compared to those utilized in coal gasification processes. In embodiments, the inner diameter $D_r$ of FT reactor 20 is greater than or equal to 10 feet and less than 60 feet. In alternative embodiments, the inner diameter $D_r$ of FT reactor 20 is greater than or equal to 12 feet. The inner diameter $D_r$ of FT reactor 20 may be greater than or equal to 1.3 feet, in certain embodiments, for example pilot scale units. In alternative embodiments, the inner diameter $D_r$ of FT reactor 20 is greater than or equal to 10 feet and less than 50 ft. In some embodiments, the inner diameter $D_r$ of FT reactor 20 is greater than or equal to 10 feet. In embodiments, the total vertical height L of reactor 20 is greater than 50 feet. In embodiments, the total vertical height L of reactor 20 is greater than 60 feet. In embodiments, the total vertical height L of reactor 20 is greater than 50 feet and less than 200 ft.

In embodiments, the inner diameter $D_s$ of each separator 30 is greater than 2 feet. In embodiments, the inner diameter $D_s$ of each separator 30 is less than or equal to the reactor diameter, $D_r$. In embodiments, the inner diameter $D_s$ of each separator 30 is greater than 2 ft. and less than or equal to the reactor diameter, $D_r$. In other cases, such as pilot plant systems, the reactor diameter, $D_r$, may be less than or equal to about 1.5 ft., and the inner diameter $D_s$ of each separator 30 may be less than or equal to the reactor diameter, $D_r$.

The slurry loop height, H (the distance between each reactor product outlet 61 and the corresponding slurry return inlet 75 of the corresponding slurry loop 65) is selected such that the pressure balance drives desired flow through slurry loop 65.

The expanded slurry height is the height of the catalyst, wax, and gas mixture in reactor 20. The gas feed and gaseous products "expand" the volume of the mixture. This expansion is caused by and may be referred to as 'gas hold up'. The slurry offtake via reactor product outlets 61 is below the expanded slurry bed height of reactor 20. Therefore, in such embodiments, slurry loop height H plus reactor base height $H_b$ is less than approximately 0.9 times the total vertical height of the reactor L, i.e. $H+H_b<0.9\,L$. (Above the expanded bed height, there will be some length of free vapor space or disengaging space, which may typically be in the range of 10-15 ft. The disengaging space serves to promote the return of solids and liquid droplets to the reactor bed).

In embodiments, slurry loop height H is greater than 0.5 times the total length L of reactor 20, i.e. H>0.5 L. In embodiments, slurry loop height H is greater than the separator height $H_s$, i.e. H>$H_s$.

As seen in FIG. 1, in embodiments, the angle $\Phi_1$ between the vertical outer wall of reactor 20 and each slurry return 70 is less than 90° and greater than 30°. As seen in FIG. 1, in embodiments, the angle $\Phi_2$ between the outer wall of reactor 20 and each slurry offtake 60 is less than 90° and greater than 30°. In some embodiments, the distance $D_{rs}$ from the outer wall of FT reactor 20 to the outer wall of separator 30 is minimized. In preferred embodiments, $D_{rs}$ is less than $D_r$, i.e. $D_{rs}<D_r$.

The diameter $D_s$ of separator 30 is ideally selected so that the upward liquid velocity in separator 30 is greater than 15 cm/hr and less than 100 cm/hr. In embodiments where a dynamic magnetic separation vessel is used, the upward liquid velocity is greater than 15 cm/h, more preferably greater than 30 cm/h and most preferable greater than 50 cm/h. In embodiments, separator 30 does not comprise significant internals, and the ratio of the separator height to the separator diameter, $H_s/D_s$, is greater than 0.9 and less than 10. In some embodiments, one or more separator 30 has a different height $H_s$ than at least one of the other separators 30. In some embodiments, one or more separator 30 has a different diameter $D_s$ than at least one of the other separators 30. For example, letting the diameters of separators 1 to 4 be $D_{s1}$, $D_{s2}$, $D_{s3}$, and $D_{s4}$ and the heights of separators 1-4 be $H_{s1}$, $H_{s2}$, $H_{s3}$, and $H_{s4}$, respectively, in some embodiments, at least one of the diameters selected from $D_{s1}$, $D_{s2}$, $D_{s3}$ and $D_{s4}$ is not equal to at least one of the other diameters. Similarly, in embodiments, at least one of the separator heights selected from $H_{s1}$, $H_{s2}$, $H_{s3}$, and $H_{s4}$ is not equal to the other separator heights.

In an alternative embodiment, FT reactor 20 as described hereinabove is encircled by an annular separation vessel around the circumference of the reactor section.

Method

Herein disclosed is a method for FT conversion of syngas to hydrocarbon products utilizing the FT system 10 of the present disclosure. In embodiments, the disclosed FT system is used as the Fischer-Tropsch portion of a coal, pet coke, biomass, or natural gas to liquids (XtL) plant. For example, syngas feed introduced to FT reactor 20 via syngas feed inlet 40 may be formed within a XTL plant. Syngas enters reactor 20 via syngas feed inlet 40. In embodiments, the gas inlet 40 comprises multiple gas nozzles, and the feed gas flow is adjusted such that the overall superficial gas velocity is greater than the average sedimentation velocity of the solid catalyst in the slurry of the fluidized bed. In some embodiments, the FT system is operated such that the overall superficial velocity is greater than about 9 cm/s. Alternatively, the FT system is operated such that the overall superficial gas velocity is greater than about 15 cm/s. In embodiments, the FT system is operated such that the overall superficial gas velocity is in the range of from about 5 cm/s to about 25 cm/s; from about 10 cm/s to about 20 cm/s, or in the range of from about 12 cm/s to about 14 cm/s.

Fischer-Tropsch Catalyst

FT reactor 20 comprises Fischer-Tropsch, or FT, catalyst effective for catalyzing the conversion of carbon monoxide and hydrogen into $C^{2+}$ hydrocarbons. The FT catalyst may comprise any FT catalyst known to those of skill in the art. In embodiments, the Fischer-Tropsch catalyst is a metal-based catalyst. In embodiments, the FT catalyst is an iron-based catalyst. In embodiments, the FT catalyst is a cobalt-based catalyst. Most preferably, the Fischer-Tropsch catalyst is an iron carbide catalyst.

Depending on the preselected alpha, i.e., the polymerization probability desired, a precipitated iron catalyst may have a weight ratio of potassium (e.g., as carbonate) to iron in the range of from about 0.005 and about 0.015, more preferably in the range of from 0.0075 to 0.0125, and most preferably about 0.010. Larger amounts of alkali metal promoter (e.g., potassium) may cause the product distribution to shift toward the longer-chain molecules, while smaller amounts of alkali metal may result in a predominantly gaseous hydrocarbon product.

The weight ratio of copper to iron in the iron Fischer-Tropsch catalyst may be in the range of from about 0.005 and 0.050, more preferably in the range of from about 0.0075 and 0.0125, and most preferably about 0.010. Copper may serve as an induction promoter. In preferred embodiments, the weight ratio of Cu:Fe is about 1:100.

The catalyst may be an iron Fischer-Tropsch catalyst comprising structural promoter. The structural promoter may significantly reduce the breakdown of the catalyst in a SBCR (slurry bubble column reactor). The structural promoter may comprise silica, and may enhance the structural integrity during activation and operation of the catalyst. In embodiments, the catalyst comprises a mass ratio of $SiO_2$:Fe of less than about 1:100 when the structural promoter comprises silica and less than about 8:100 when the structural promoter comprises silica sol.

In embodiments, the at least one structural promoter is selected from oxides of metals and metalloids and combinations thereof. The structural promoter may be referred to as a binder, a support material, or a structural support.

Depending on the level of structural promoter comprising silicate and the preselected alpha, i.e. the polymerization probability desired, the weight ratio of K:Fe may be from about 0.5:100 to about 6.5:100. More preferably, the weight ratio of K:Fe is from about 0.5:100 to about 2:100. In some embodiments, the weight ratio of K:Fe is about 1:100.

In some embodiments wherein the structural promoter comprises silica sol, the weight ratio of iron to potassium is in the range of from about 100:1 to about 100:5. In some embodiments, the weight ratio of iron to potassium is in the range of from about 100:2 to about 100:6. In more preferred embodiments, the weight ratio of iron to potassium is in the range of from about 100:3 to about 100:5. In some embodiments, the weight ratio of iron to potassium is in the range of from about 100:4 to about 100:5. In some preferred embodiments, the weight ratio of iron to potassium is in the range of from about 100:2 to about 100:4. In some specific embodiments, the weight ratio of iron to potassium about 100:3. In other certain embodiments, the weight ratio of iron to potassium is about 100:5.

In embodiments wherein the structural promoter comprises silica sol, the weight ratio of iron to copper may be in the range of from about 100:1 to about 100:7. In some embodiments, the weight ratio of iron to copper is in the range of from about 100:1 to about 100:5. More preferably, the weight ratio of iron to copper is in the range of from about 100:2 to about 100:6. Still more preferably, the weight ratio of iron to copper is in the range of from about 100:3 to about 100:5. In some preferred embodiments, the weight ratio of iron to copper is in the range of from about 100:2 to about 100:4. In other specific embodiments, the weight ratio of iron to copper is about 100:5. In yet other specific embodiments, the weight ratio of iron to copper is about 100:3.

Broadly, in embodiments, wherein the structural promoter is silica sol, the iron to $SiO_2$ weight ratio may be in the range of from about 100:1 to about 100:8; alternatively, in the range of from 100:1 to 100:7. More preferably, in some embodiments, wherein the structural promoter is silica, the iron to $SiO_2$ weight ratio may be in the range of from about 100:2 to about 100:6. Still more preferably, the weight ratio of iron to silica is in the range of from about 100:3 to about 100:5. In some preferred embodiments, wherein the structural promoter is silica, the iron to $SiO_2$ weight ratio is about 100:5. In embodiments, wherein the structural promoter is silica, the iron to $SiO_2$ weight ratio may be in the range of from about 100:3 to about 100:7; alternatively, in the range of from about 100:4 to about 100:6. In some preferred embodiments, the Fe:Cu:K:$SiO_2$ mass ratio is about 100:4:3:5.

Fresh activated FT catalyst may enter reactor 20 as needed via an activated catalyst inlet (not shown). Within reactor 20, FT conversion of syngas produces product hydrocarbons via the FT reaction. The FT reaction is exothermic. In embodiments, the heat of reaction is removed via coils through which a fluid flows. In embodiments, the fluid in the coils is water. In embodiments, the coils generate steam at pressures in the range of from about 200 psig to about 500 psig. In embodiments, the coils produce steam in the range of from about 400 psig to about 450 psig. The flow rate of fluid through the coils may be adjusted during operation of FT system 10 to remove different amounts of heat from reactor 20. Alternatively, by directly or indirectly adjusting the temperature of the fluid in the coils, different amounts of heat may be removed from reactor 20. The steam produced by the FT system 10 may be used in any manner known to those of skill in the art. For example, the steam may be used to produce electricity, to preheat a fluid stream, or a combination thereof.

Overhead tail gas produced during the FT reaction is removed via the at least one overhead tail gas outlet 50. Overhead tail gas may be sent for further processing as known to those of skill in the art. For example, the overhead tail gas may undergo further processing/separation to obtain crude light distillate, crude mid-distillate, FT water, FT tail gases from which product has been removed, or a combination thereof. A portion of the tail gas from which product has been removed may be returned to the FT reactor 20 with inlet syngas feed via, for example, syngas feed inlet 40.

During operation of FT system 10, catalyst slurry is separated from FT product produced in reactor 20 via the at least two slurry loops 65. In other embodiments of the method, catalyst slurry is separated from FT product produced in reactor 20 via the at least three slurry loops 65. In still other embodiments of the method, catalyst slurry is separated from FT product produced in reactor 20 via the at least four slurry loops 65.

Portions of slurry product are removed from the reactor 20 via reactor product outlets 61 and slurry offtakes 60. The slurry containing product removed via each slurry offtake 60 enters at least one separator 30 capable of separating liquid product from concentrated catalyst slurry. In embodiments, the upward liquid velocity in each separator 30 is greater than 15 cm/h. In embodiments, the upward liquid velocity in each separator 30 is less than about 100 cm/hr. In embodiments, the upward liquid velocity in each separator 30 is greater than about 15 cm/hr and less than about 100 cm/h. In embodiments where a dynamic magnetic separation vessel is used-used the upward liquid velocity is greater than 15 cm/h, more preferably greater than 30 cm/h and most preferably greater than 50 cm/h.

In embodiments, gaseous product removed in separator 30 is sent for further processing via separator gas stream 90 and separator gas outlet 91. For example, at least a portion of separator gas stream 90 from each slurry loop 65 may be returned to reactor 20, sent for further processing, or a combination thereof.

Separated product stream 80 leaves each separator 30 via clarified wax outlet 81. This liquid product may be further processed as known to those of skill in the art. For example, separated product stream 80 may be further separated into crude wax and spent catalyst/wax which may be disposed, recycled, or a combination thereof.

Concentrated catalyst slurry leaves the at least one separator 30 of each slurry loop 65 via a concentrated catalyst slurry outlet 71 and returns to reactor 20 via a slurry return 70 and a slurry return inlet 75. Spent catalyst may be removed from separators 30, reactor 20, or a combination thereof for reactivation and recycle, disposal, or a combination thereof.

At least a portion of the FT liquid hydrocarbon product may be further processed. For example, at least a portion of the FT liquid hydrocarbon product may be hydrogenated to saturate olefinic and oxygenated components. At least a portion of the liquid hydrocarbon product removed from the slurry loops may be subjected to hydro-cracking, hydro-isomerization, or both. In this manner, the average number of carbons in the product may be adjusted to within a range that maximizes the production of liquid fuels in the range of diesel and/or jet fuel.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, and so forth). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The disclosures of all patents, patent applications, and publications cited herein are hereby incorporated by reference, to the extent they provide exemplary, procedural or other details supplementary to those set forth herein.

What is claimed is:

1. A catalytic reaction system comprising:
 a catalytic reactor fluidly connected with at least two slurry loops, wherein the catalytic reactor is a substantially cylindrical vessel, wherein the substantially cylindrical vessel comprises openings therethrough providing at least as many reactor product outlets and at least as many slurry return inlets as slurry loops;

wherein each slurry loop comprises a separation system external to the catalytic reactor and comprising at least one separation device for separating concentrated catalyst slurry and gas from liquid product, wherein the at least one separation device comprises a product outlet for removal of liquid product therefrom; a slurry offtake fluidly connecting an inlet of the at least one separation device to one of the reactor product outlets such that, during operation, a portion of a slurry within the catalytic reactor can be introduced directly from the vessel to the separation device; a slurry return fluidly connecting an outlet of the at least one separation device to one of the slurry return inlets; and a separator gas outlet located at or near a top of the at least one separation device, and through which gas is removed therefrom, wherein at least one separation device of at least one separation system comprises a magnetic dynamic separation vessel comprising a vertical feed conduit fluidly connected with the inlet of the magnetic dynamic separation vessel, and wherein the vertical feed conduit is located at a side of the magnetic dynamic settling vessel and extends at least 70% of the length of the magnetic dynamic separation vessel.

2. The system of claim 1 comprising at least 3 slurry loops.

3. The system of claim 2 comprising at least 4 slurry loops.

4. The system of claim 1 wherein the catalytic reactor is a multi-phase Fischer-Tropsch slurry bubble column reactor.

5. The system of claim 4 wherein the catalytic reactor has a main cylindrical body with an inner diameter greater than 6 feet.

6. The system of claim of 4 wherein the catalytic reactor has a total vertical height greater than 50 feet.

7. The system of claim of 1 wherein the catalytic reactor has exterior walls that can withstand internal pressures in the range of from about 10 atmospheres to about 40 atmospheres.

8. The system of claim of 1 wherein the catalytic reactor further comprises a synthesis gas inlet comprising multiple nozzles.

9. The system of claim 8 wherein additional multiple nozzles are positioned within the lower 50% of the total vertical height (L) of the catalytic reactor.

10. The system of claim 9 wherein the multiple nozzles are positioned within the lower 20% of the total vertical height of the catalytic reactor.

11. The system of claim 1 wherein the reactor product outlets are located within the top 50% of the total vertical height of the catalytic reactor.

12. The system of claim 1 wherein the reactor product outlets have a diameter in the range of from about 4 in. and about 5 ft.

13. The system of claim 1 wherein at least one separation system of the at least two slurry loops comprises 2 or more dynamic settlers.

14. The system of claim 1 wherein each separation system comprises at least one separation device selected from the group consisting of filtration units, magnetic separators, vertical settlers, inclined settlers, dynamic settlers, dynamic magnetic settling vessels and combinations thereof.

15. The system of claim 14 wherein the catalytic reactor has an internal diameter, and wherein the internal diameter of each separation device is greater than about 2 ft. and less than the internal diameter of the catalytic reactor.

16. The system of claim 15 wherein the vertical height of each separation device is less than the slurry loop height of the catalytic reactor.

17. The system of claim 1 wherein the slurry return inlets are positioned within the bottom 50% of the total vertical height of the catalytic reactor.

18. The system of claim 1 wherein the distance between the reactor product outlet and the slurry return inlet of at least one slurry loop is greater than about half the total vertical height of the catalytic reactor.

19. The system of claim 1 wherein the distance between the reactor product outlet and the slurry return inlet of each slurry loop is greater than about one half the total vertical height of the catalytic reactor.

20. The system of claim 1 wherein the reactor product outlets are located in the lower 90% of the total vertical height of the catalytic reactor.

21. The system of claim 1 wherein the at least one magnetic dynamic separation vessel operates via a magnetic field therein.

* * * * *